US006636920B1

(12) United States Patent
Larson (10) Patent No.: US 6,636,920 B1
(45) Date of Patent: Oct. 21, 2003

(54) ENHANCED BUS CONNECTIVITY THROUGH DISTRIBUTED LOADING

(75) Inventor: Douglas A. Larson, Lakeview, MN (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/384,665

(22) Filed: Aug. 27, 1999

(51) Int. Cl.⁷ .............................................. G06F 13/14
(52) U.S. Cl. ...................................................... 710/305
(58) Field of Search .................................. 710/305–316

(56) References Cited

U.S. PATENT DOCUMENTS

| | | | | |
|---|---|---|---|---|
| 5,761,443 A | * | 6/1998 | Kranich ...................... 395/280 |
| 5,828,865 A | * | 10/1998 | Bell ............................ 395/500 |
| 5,859,989 A | * | 1/1999 | Olarig et al. ................ 395/309 |
| 6,233,632 B1 | * | 5/2001 | Meiyappan et al. ........... 710/66 |
| 6,256,689 B1 | * | 7/2001 | Khosrowpour ............... 710/101 |

OTHER PUBLICATIONS

PCI Specification Interest Group, "PCI LOCAL BUS SPECIFICATION," Revision 2.2, pp. i–xx, 1–302, Dec. 18, 1998.

* cited by examiner

Primary Examiner—Sumati Lefkowitz
Assistant Examiner—X. Chung-Trans
(74) Attorney, Agent, or Firm—Trop, Pruner & Hu, P.C (57) ABSTRACT

A Peripheral Component Interconnect (PCI) interface unit providing a duplicate set of control signals enhances the load bearing capacity of a PCI bus. The duplicate set of control signals permit devices coupled to the original set of control signals to be electrically decoupled from devices coupled to the duplicate set of control signals. Decoupling in this manner distributes PCI bus loads between a first sub-bus associated with the original set of control signals and a second sub-bus associated with the duplicate set of control signals; each sub-bus may support the maximum number of loads.

28 Claims, 8 Drawing Sheets

BRIDGE CIRCUIT 308 INITIATED 32-BIT WRITE TRANSACTION
---

IF (IN ADDRESS PHASE OF TRANSACTION) THEN
       COUPLE UPPER DATA SIGNALS 314 TO DATA OUTPUT[31::0] SIGNALS 404
       COUPLE LOWER DATA SIGNALS 318 TO DATA OUTPUT[31::0] SIGNALS 404
       COUPLE UPPER CONTROL SIGNALS 312 TO CONTROL OUTPUT SIGNALS 402
       COUPLE LOWER CONTROL SIGNALS 316 TO CONTROL OUTPUT SIGNALS 402
ELSE
       COUPLE UPPER DATA SIGNALS 314 TO DATA OUTPUT[31::0] SIGNALS 404
       COUPLE LOWER DATA SIGNALS 318 TO DATA OUTPUT[31::0] SIGNALS 404

IF (DEVICE COUPLED TO AN UPPER 32-BIT CONNECTOR CLAIMS TRANSACTION) THEN
              COUPLE UPPER CONTROL SIGNALS 312 TO CONTROL INPUT SIGNALS 406
              CLOSE TRANSACTION ON LOWER CONTROL SIGNALS 316 WITH A RETRY STATUS
       ELSE
              COUPLE LOWER CONTROL SIGNALS 316 TO CONTROL INPUT SIGNALS 406
              CLOSE TRANSACTION ON UPPER CONTROL SIGNALS 312 WITH A RETRY STATUS
       END IF
END IF

DATA INPUT SIGNALS 408 ARE DON'T CARE

FIG. 5

BRIDGE CIRCUIT 308 INITIATED 64-BIT WRITE TRANSACTION
---

IF (IN ADDRESS PHASE OF TRANSACTION) THEN
       COUPLE UPPER DATA SIGNALS 314 TO DATA OUTPUT[31::0] SIGNALS 404
       COUPLE LOWER DATA SIGNALS 318 TO DATA OUTPUT[31::0] SIGNALS 404
       COUPLE UPPER CONTROL SIGNALS 312 TO CONTROL OUTPUT SIGNALS 402
       COUPLE LOWER CONTROL SIGNALS 316 TO CONTROL OUTPUT SIGNALS 402
ELSE
       COUPLE UPPER DATA SIGNALS 314 TO DATA OUTPUT[63::32] SIGNALS 404
       COUPLE LOWER DATA SIGNALS 318 TO DATA OUTPUT[31::0] SIGNALS 404
       CLOSE TRANSACTION ON UPPER CONTROL SIGNALS 312 WITH A RETRY STATUS
       COUPLE LOWER CONTROL SIGNALS 316 TO CONTROL INPUT SIGNALS 406
END IF

DATA INPUT SIGNALS 408 ARE DON'T CARE

FIG. 6

BRIDGE CIRCUIT 308 INITIATED 32-BIT READ TRANSACTION
---

IF (IN ADDRESS PHASE OF TRANSACTION) THEN
    COUPLE UPPER DATA SIGNALS 314 TO DATA OUTPUT[31::0] SIGNALS 404
    COUPLE LOWER DATA SIGNALS 318 TO DATA OUTPUT[31::0] SIGNALS 404
    COUPLE UPPER CONTROL SIGNALS 312 TO CONTROL OUTPUT SIGNALS 402
    COUPLE LOWER CONTROL SIGNALS 316 TO CONTROL OUTPUT SIGNALS 402
ELSE
    UPPER DATA SIGNALS 314 ARE CAN'T CARE
    LOWER DATA SIGNALS 318 DRIVEN BY EXTERNAL/NON-BRIDGE CIRCUIT DEVICE     IF (DEVICE COUPLED TO AN UPPER 32-BIT CONNECTOR CLAIMS TRANSACTION) THEN
        COUPLE UPPER DATA SIGNALS 314 TO DATA INPUT[31::0] SIGNALS 408
        COUPLE UPPER CONTROL SIGNALS 312 TO CONTROL INPUT SIGNALS 406
        CLOSE TRANSACTION ON LOWER CONTROL SIGNALS 316 WITH A RETRY
STATUS
        DATA INPUT[63::32] SIGNALS 408 ARE DON'T CARE
    ELSE
        COUPLE LOWER DATA SIGNALS 318 TO DATA INPUT[31::0] SIGNALS 408
        COUPLE LOWER CONTROL SIGNALS 316 TO CONTROL INPUT SIGNALS 406
        CLOSE TRANSACTION ON UPPER CONTROL SIGNALS 312 WITH A RETRY
STATUS
        DATA INPUT[63::32] SIGNALS 408 ARE DON'T CARE
    END IF
END IF

FIG. 7

BRIDGE CIRCUIT 308 INITIATED 64-BIT READ TRANSACTION
---

IF (IN ADDRESS PHASE OF TRANSACTION) THEN
    COUPLE UPPER DATA SIGNALS 314 TO DATA OUTPUT[31::0] SIGNALS 404
    COUPLE LOWER DATA SIGNALS 318 TO DATA OUTPUT[31::0] SIGNALS 404
    COUPLE UPPER CONTROL SIGNALS 312 TO CONTROL OUTPUT SIGNALS 402
    COUPLE LOWER CONTROL SIGNALS 316 TO CONTROL OUTPUT SIGNALS 402
ELSE
    COUPLE UPPER DATA SIGNALS 314 TO DATA INPUT[63::32] SIGNALS 408
    COUPLE LOWER DATA SIGNALS 318 TO DATA INPUT[31::0] SIGNALS 408
    CLOSE TRANSACTION ON UPPER CONTROL SIGNALS 312 WITH A RETRY STATUS
    COUPLE LOWER CONTROL SIGNALS 316 TO CONTROL INPUT SIGNALS 406
END IF

FIG. 8

LOWER CONNECTOR 304 COUPLED DEVICE INITIATED 32-BIT WRITE TRANSACTION
---
UPPER DATA SIGNALS 314 ARE DON'T CARE
COUPLE LOWER DATA SIGNALS 318 TO DATA INPUT[31::0] SIGNALS 408
UPPER CONTROL SIGNALS 312 ARE DON'T CARE
COUPLE LOWER CONTROL SIGNALS 316 TO CONTROL INPUT SIGNALS 406
DATA INPUT[63::32] SIGNALS 408 ARE DON'T CARE

FIG. 9

UPPER CONNECTOR 302 COUPLED DEVICE INITIATED 32-BIT WRITE TRANSACTION
---
COUPLE UPPER DATA SIGNALS 314 TO DATA INPUT[31::0] SIGNALS 408
LOWER DATA SIGNALS 318 ARE DON'T CARE
COUPLE UPPER CONTROL SIGNALS 312 TO CONTROL INPUT SIGNALS 406
LOWER CONTROL SIGNALS 316 ARE DON'T CARE
DATA INPUT[63::32] SIGNALS 408 ARE DON'T CARE

FIG. 10

EXTERNAL/NON-BRIDGE CIRCUIT INITIATED 64-BIT WRITE TRANSACTION
---
COUPLE UPPER DATA SIGNALS 314 TO DATA INPUT[63::32] SIGNALS 408
COUPLE LOWER DATA SIGNALS 318 TO DATA INPUT[31::0] SIGNALS 408
UPPER CONTROL SIGNALS 312 ARE DON'T CARE
COUPLE LOWER CONTROL SIGNALS 316 TO CONTROL INPUT SIGNALS 406

FIG. 11

LOWER CONNECTOR 304 COUPLED DEVICE INITIATED 32-BIT READ TRANSACTION

IF (IN ADDRESS PHASE OF TRANSACTION) THEN
      UPPER DATA SIGNALS 314 ARE DON'T CARE
      LOWER DATA SIGNALS 318 DRIVEN BY EXTERNAL/NON-BRIDGE CIRCUIT
DEVICE
ELSE
      UPPER DATA SIGNALS 314 ARE DON'T CARE
      COUPLE LOWER DATA SIGNALS 318 TO DATA OUTPUT[31::0] SIGNALS 404
END IF COUPLE LOWER CONTROL SIGNALS 316 TO CONTROL INPUT SIGNALS 406
UPPER CONTROL SIGNALS 312 ARE DON'T CARE
DATA INPUT SIGNALS 408 ARE DON'T CARE

FIG. 12

UPPER CONNECTOR 302 COUPLED DEVICE INITIATED 32-BIT READ TRANSACTION

IF (IN ADDRESS PHASE OF TRANSACTION) THEN
      UPPER DATA SIGNALS 314 DRIVEN BY EXTERNAL/NON-BRIDGE CIRCUIT
DEVICE
      LOWER DATA SIGNALS 318 ARE DON'T CARE
ELSE
      COUPLE UPPER DATA SIGNALS 314 TO DATA OUTPUT[31::0] SIGNALS 404
      LOWER DATA SIGNALS 318 ARE DON'T CARE
END IF COUPLE UPPER CONTROL SIGNALS 312 TO CONTROL INPUT SIGNALS 406
LOWER CONTROL SIGNALS 316 ARE DON'T CARE
DATA INPUT SIGNALS 408 ARE DON'T CARE

FIG. 13

64-BIT CONNECTOR 306 COUPLED DEVICE INITIATED 64-BIT READ TRANSACTION

```
IF (IN ADDRESS PHASE OF TRANSACTION) THEN
        UPPER DATA SIGNALS 314 DRIVEN BY EXTERNAL/NON-BRIDGE CIRCUIT
DEVICE
        LOWER DATA SIGNALS 318 DRIVEN BY EXTERNAL/NON-BRIDGE CIRCUIT
DEVICE
ELSE
        COUPLE UPPER DATA SIGNALS 314 TO DATA OUTPUT[63::32] SIGNALS 404
        COUPLE LOWER DATA SIGNALS 318 TO DATA OUTPUT[31::0] SIGNALS 404
END IF

COUPLE LOWER CONTROL SIGNALS 316 TO CONTROL INPUT SINGALS 406
UPPER CONTROL SIGNALS 312 ARE DON'T CARE
DATA INPUT SIGNALS 408 ARE DON'T CARE
```

ENHANCED BUS CONNECTIVITY THROUGH DISTRIBUTED LOADING

BACKGROUND

The invention relates generally to data processing systems and, more particularly, to methods and apparatuses for enhancing the electrical load bearing capacity of a bus for such systems.

Figure 1:
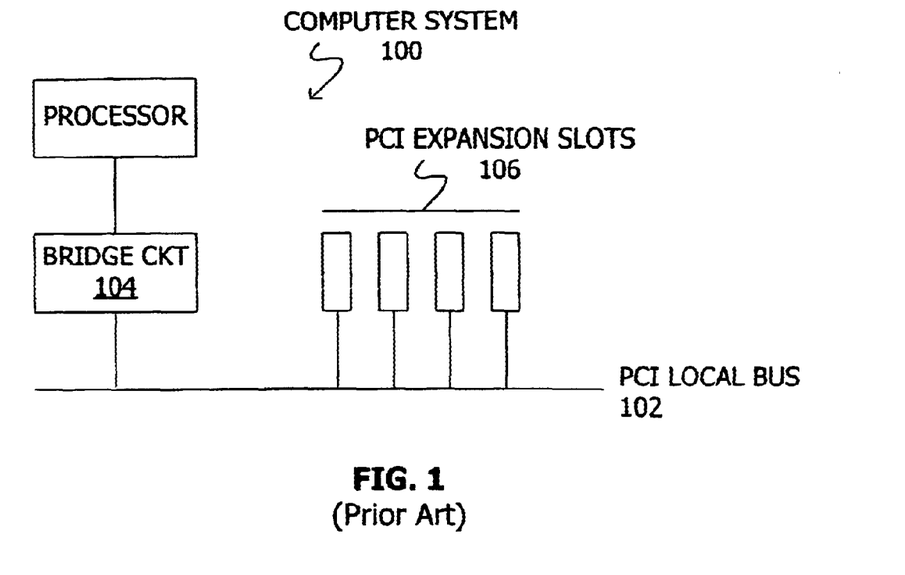
FIG. 1 illustrates a prior art computer system having Peripheral Component Interface (PCI) local bus expansion slots.

Referring to FIG. 1, illustrative prior art computer system 100 utilizes Peripheral Component Interconnect (PCI) local bus 102 (controlled through bridge circuit 104) to provide system expansion capability through, for example, PCI expansion slots 106. The mechanical, electrical, and operational characteristics of the current 64-bit PCI local bus standard may be found in the "PCI Local Bus Specification" (revision 2.2, 1998), available from the PCI Special Interest Group in Portland, Oreg.

The PCI local bus specification was designed to provide a processor-independent interface to add-in boards, also commonly referred to as expansion cards or adapters. Because of signal integrity constraints, PCI bus 102 is typically limited in both data transfer rate and fan-out (number of adapter slots supported). The current 33 MHz 64-bit PCI architecture definition provides a peak data transfer rate of 264 megabytes per second (MB/s) and supports approximately 10 loads: one load attributable to bridge circuit 104; one load attributable to a second bridge circuit (typically used to couple PCI local bus 102 to a secondary bus conforming to, for example, the Low Pin Count (LPC), Industry Standard Architecture (ISA) or Extended Industry Standard Architecture (EISA) standards); and 2 loads for each of 4 expansion slots 106. Even more restrictive, in terms of expansion capability, is the current 66 MHz PCI architecture which is limited to approximately 6 loads (while providing a peak data transfer rate of 528 MB/s)—allowing only 2 expansion slots.

Figure 2:
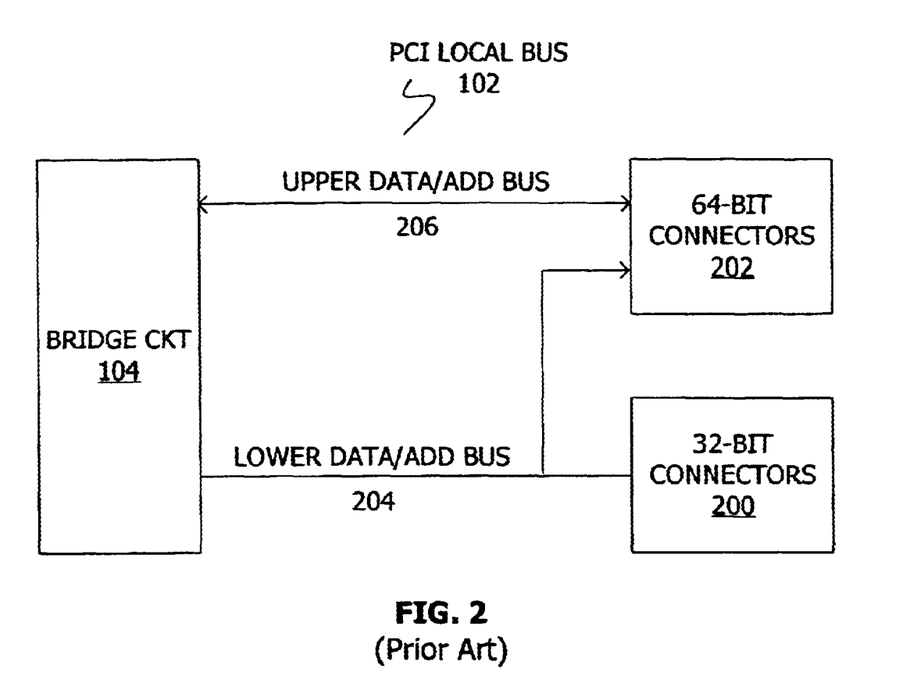
FIG. 2 illustrates a 64-bit PCI local bus interconnect scheme in accordance with the prior art.

Referring to FIG. 2, 64-bit PCI local bus 102 generally couples bridge circuit 104 with one or more 32-bit PCI connectors 200 and one or more 64-bit connectors 202 (the total number of connectors limited by local bus 102 loading restrictions). As illustrated, lower address/data lines 204 (AD[31::0], C/BE[3::0]#, and PAR signal lines) interconnect bridge circuit 104 with both 32-bit and 64-bit connectors 200 and 202 respectively, while upper address/data lines 206 (AD[63::32], C/BE[7::4]#, PAR64, REQ64#, and ACK64# signal lines) interconnect bridge circuit 104 with 64-bit connectors 202.

As shown in FIG. 2, lower address/data lines 204 are coupled to every PCI device on local bus 102. It is common, however, for a computer system to have only 1 64-bit PCI device. This situation leads to a very unbalanced loading between the lower and upper address/data lines 204 and 206 respectively. This, in turn, limits the total number of PCI devices that may be coupled to computer system 100. Thus, it would be beneficial to distribute the load of 32-bit and 64-bit expansion devices so as to provide increased expansion capability.

SUMMARY

The invention provides a technique for enhancing the electrical load bearing capacity of a computer system bus. In one embodiment, the bus comprises a 64-bit Peripheral Component Interconnect (PCI) bus having an additional set of control signals, wherein the additional set of control signals duplicate the standard PCI FRAME#, TRDY#, IRDY#, STOP#, DEVSEL#, and LOCK# signals. The duplicate set of control signals may be used to electrically decouple devices coupled to the original set of control signals from devices coupled to the duplicate set of control signals. In another embodiment, the invention provides a computer system having a bus as described above and a plurality of bus device connectors; some of the connectors are coupled to the original set of control signals and some of which are coupled to the duplicate set of control signals.

BRIEF DESCRIPTION OF THE DRAWINGS

FIGS. 5 through 8 describe the signal routing actions taken by signal control unit (of FIG. 4) during bridge circuit initiated bus transactions in accordance with one embodiment of the invention.

DETAILED DESCRIPTION

Techniques for enhancing the electrical load bearing capacity of a computer system bus are described. The following embodiments, described in terms of distributing loads associated with a computer system bus operated in conformance with the Peripheral Component Interconnect (PCI) standard, are illustrative only and are not to be considered limiting in any respect.

Figure 3:
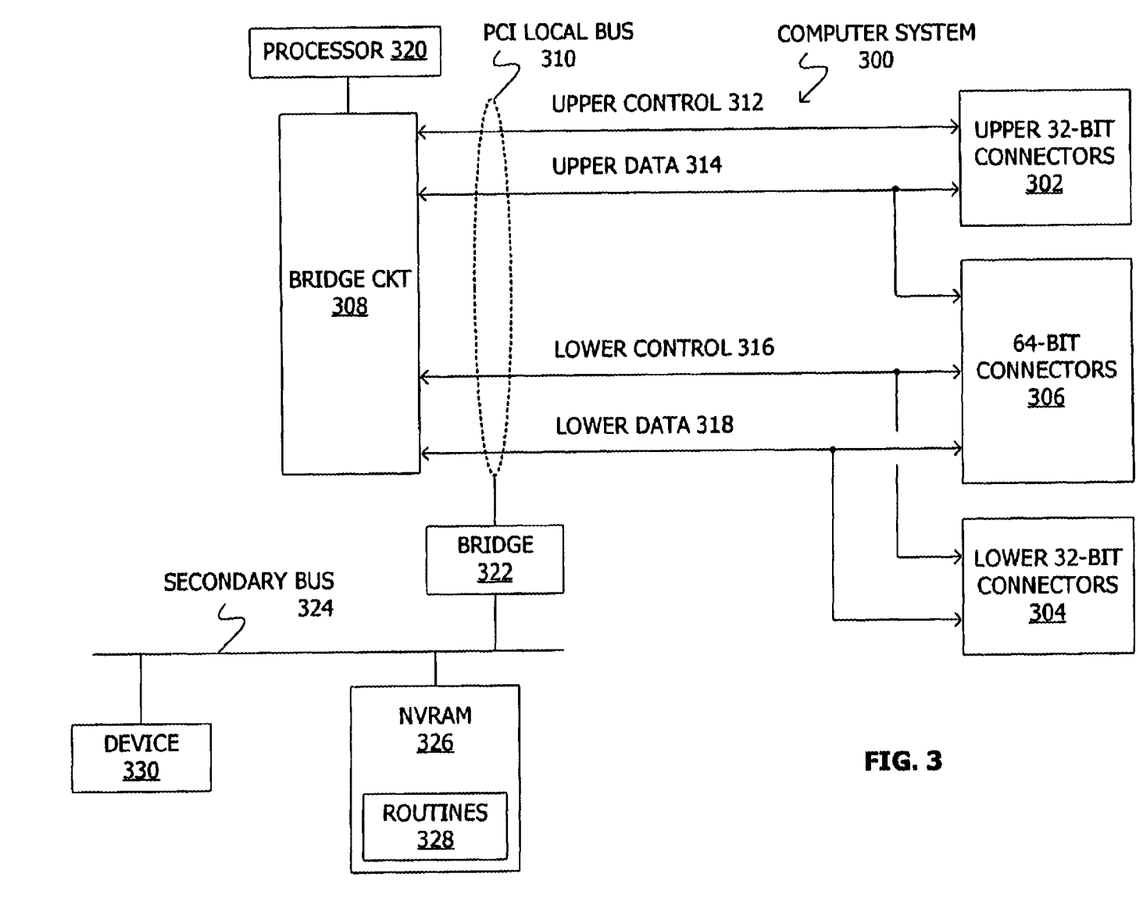
FIG. 3 shows a block diagram of a computer system in accordance with one embodiment of the invention.

A block diagram of a computer system in accordance with one embodiment of the invention is depicted in FIG. 3. As shown, computer system 300's PCI expansion slots are divided into upper 32-bit connectors 302, lower 32-bit connectors 304, and 64-bit connectors 306—all of which are coupled to bridge circuit 308 via PCI local bus 310. To facilitate the following description, signals comprising PCI local bus 310 have been divided into 5 categories as listed in Table 1: those 32-bit expansion slots designated as upper expansion slots (i.e., associated with connectors 302) receive upper control 312 and upper data 314 signals; those 32-bit expansion slots designated as lower expansion slots (i.e., associated with connectors 304) receive lower control 316 and lower data 318 signals; and all 64-bit expansion slots (i.e., associated with connectors 306) receive upper data 314, lower data 318, and lower control 316 signals.

TABLE 1

Illustrative PCI Signal Categories

| Category | PCI Signals |
|---|---|
| Upper Control 312 | Replication of lower control signals 316 |
| Upper Data 314 | AD[63::32], C/BE[7::4]#, and PAR64 |

TABLE 1-continued

Illustrative PCI Signal Categories

| Category | PCI Signals |
| --- | --- |
| Lower Control 316 | FRAME#, TRDY#, IRDY#, STOP#, DEVSEL#, and LOCK# |
| Lower Data 318 | AD[31::0], C/BE[3::0]#, and PAR |
| Other | Remainder of PCI signals (not applicable to current discussion) |

As shown, computer system 300 may also include processor 320, bridge circuit 322 coupling PCI local bus 310 to secondary bus 324, non-volatile storage device 326 (having software routines 328 stored therein—see discussion below), and one or more secondary bus devices 330. Illustrative processors (e.g., processor 320) include the PENTIUM processor and 80×86 family of processors from Intel Corporation. An illustrative secondary bus bridge circuit (e.g., bridge circuit 322) is the PIIx4 PCI-to-ISA/IDE accelerator chip from Intel Corporation. Illustrative secondary buses (e.g., bus 324) include those bus structures operated in conformance with the Low Pin Count (LPC) interface, Industry Standard Architecture (ISA) and Extended Industry Standard Architecture (EISA) standards. Illustrative non-volatile memory devices (e.g., NVRAM 326) include read only memory (ROM), electrically programmable read only memory (EPROM), electrically erasable programmable read only memory (EEPROM), flash memory, and complementary metal oxide semiconductor (CMOS) memory. Illustrative secondary bus devices (e.g., device 330) include keyboard controllers, floppy disk controllers, infrared transceiver devices, and the like.

Upper control signals 312 (a replication of standard PCI control signals FRAME#, TRDY#, IRDY#, STOP#, DEVSEL#, and LOCK#, see Table 1) permit bridge circuit 208 to decouple, or isolate, loads presented by devices coupled to upper 32-bit connectors 302 from those loads presented by devices coupled to lower 32-bit connectors 304-creating two 32-bit PCI busses, each of which may support the maximum allowable number loads.

Figure 4:
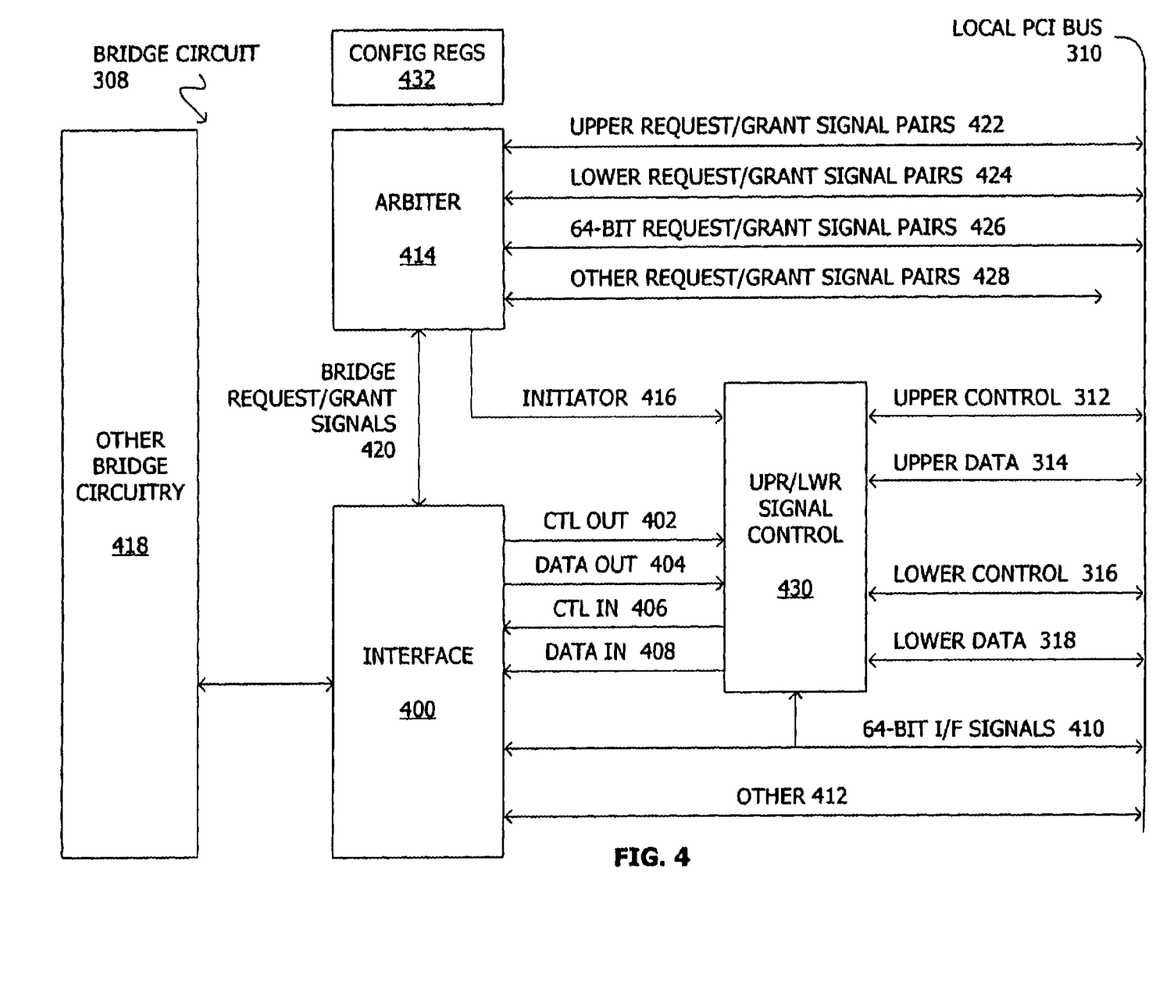
FIG. 4 shows a block diagram of a PCI bus bridge circuit in accordance with one embodiment of the invention.
Figure 9:
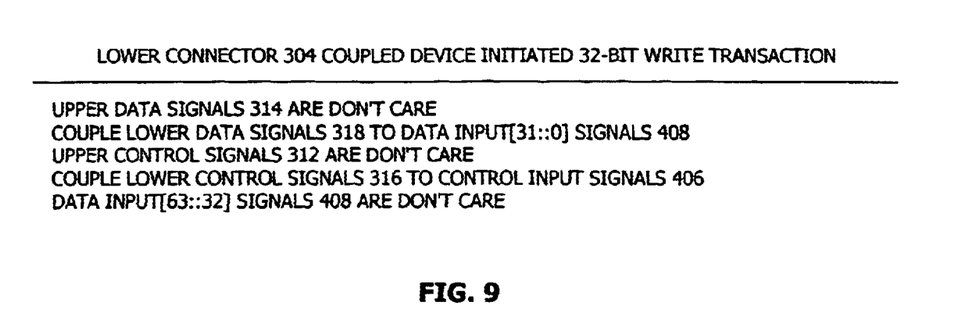
FIGS. 9 through 14 describe the signal routing actions taken by signal control unit (of FIG. 4) during non-bridge circuit initiated bus transactions in accordance with once embodiment of the invention.
Figure 10:
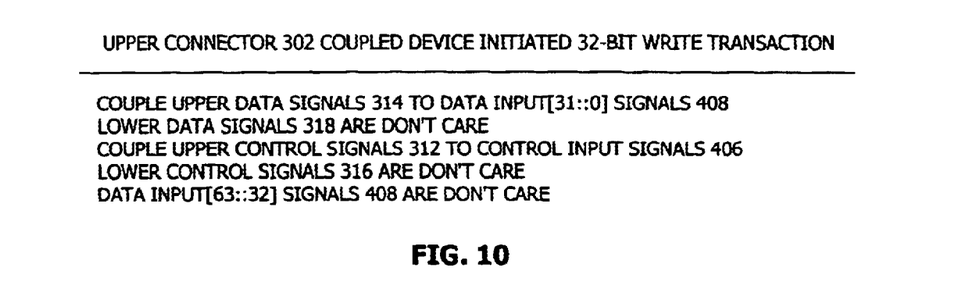
Figure 11:
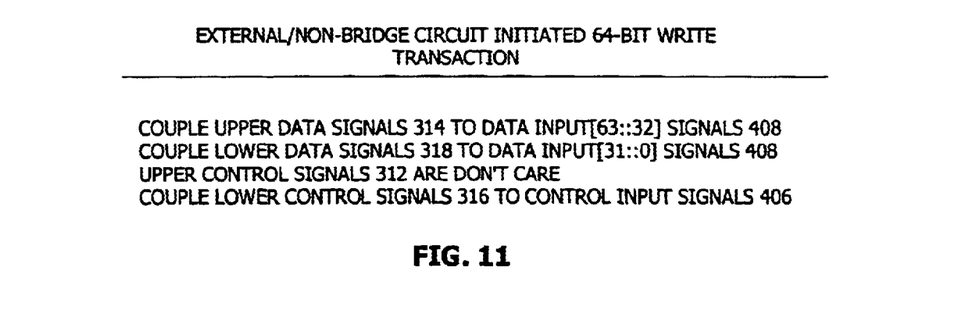
Figure 12:
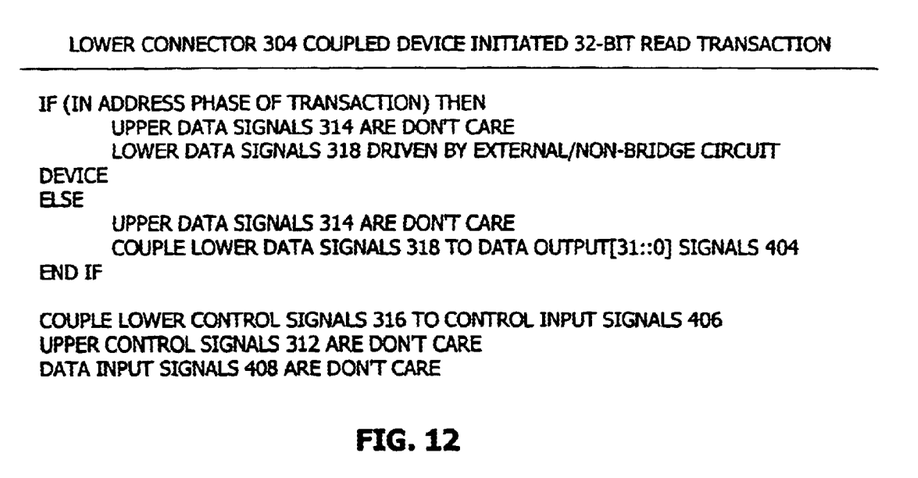
Figure 13:
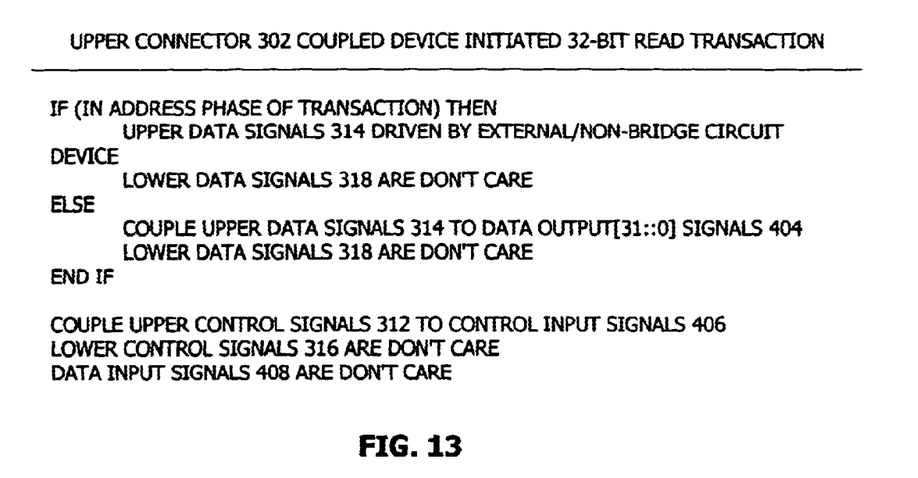
Figure 14:
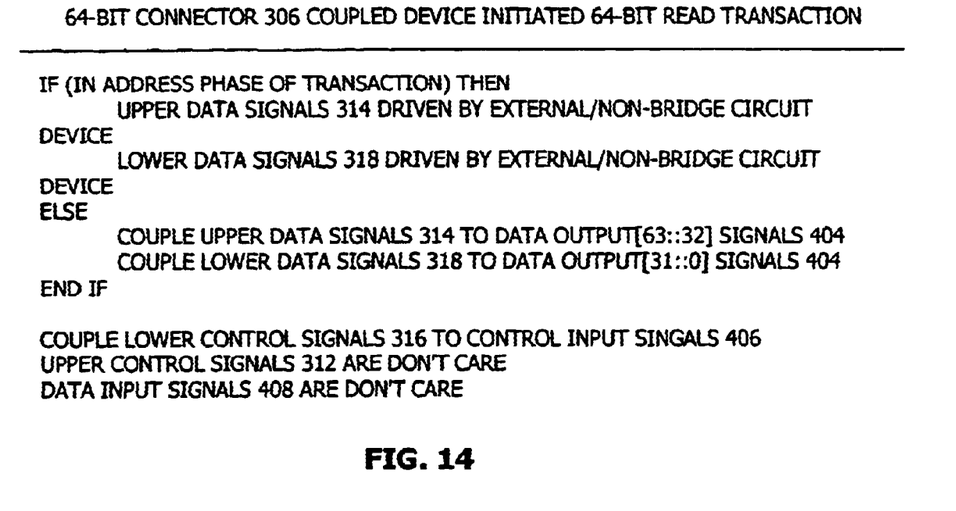

Referring to FIG. 4, a block diagram of bridge circuit 308 in accordance with one embodiment of the invention is depicted. Bus interface unit 400 provides a standard 64-bit PCI interface including control output signals 402 (FRAME#, TRDY#, IRDY#, STOP#, DEVSEL#, and LOCK#), data output signals 404 (AD[63::0], C/BE[7::0], PAR and PAR64 signals), control input signals 406 (FRAME#, TRDY#, IRDY#, STOP#, DEVSEL#, and LOCK#), data input signals 408 (AD[63::0], C/BE[7::0], PAR and PAR64 signals), 64-bit interface signals 410 (e.g., REQ64# and ACK64# signals), and other PCI signals 412 (see Table 1).

Arbiter 414 may be a conventional PCI arbiter modified to generate initiator signal 416 (see discussion below), where initiator signal 416 indicates which device (bridge circuit 308 or a device other than bridge circuit 308) is driving local PCI bus 310. In accordance with the current PCI specification, arbiter 414 implements a request-grant handshake protocol wherein each device that may communicate on local bus 310 has a corresponding request/grant signal pair. For example, arbiter 414 mediates PCI communication with bridge circuit 308 (i.e., other bridge circuitry 418) via request/grant signal pair 420, with 32-bit devices coupled to upper 32-bit connectors 302 (not shown in FIG. 4) via request/grant signal pairs 422, with 32-bit devices coupled to lower 32-bit connectors 304 (not shown in FIG. 4) via request/grant signal pairs 424, with 64-bit devices coupled to 64-bit connectors 306 (not shown in FIG. 4) via request/grant signal pairs 426; and with other computer system motherboard devices (not shown in FIG. 4) via request/grant signal pairs 428.

Signal control unit 430 selectively couples local bus signals (upper control 312, upper data 314, lower control 316 and lower data 318) to the appropriate interface unit 400 signal paths (control output 402, data output 404, control input 406, data input 408) based on the type of transaction (i.e., a read or write transaction) and which device is driving the transaction—bridge circuit 308 or another device (determined in accordance with initiator signal 416). FIGS. 5 through 8 describe the signal routing actions taken by signal control unit 430 during bridge circuit 308 initiated bus transactions. FIGS. 9 through 14 describe the signal routing actions taken by signal control unit 430 during non-bridge circuit 308 initiated bus transactions, i.e., 32-bit devices coupled to upper and lower connectors 302 and 304 respectively and 64-bit connectors 306.

Referring again to FIGS. 3 and 4, in one embodiment basic input-output system (BIOS) routines 328 populate configuration register(s) 432 of bridge circuit 308 during computer system power on self-test (POST) operations. For example, POST routines 328 may indicate (via configuration register(s) 432) which request/grant signal pairs are associated with upper 32-device connectors, and/or lower 32-bit device connectors and 64-bit device connectors. As indicated in FIG. 3, BIOS routines 328 (and associated data reflecting upper 32-bit, lower 32-bit and 64-bit connectors) may be stored in non-volatile memory device 326. In another embodiment, PCI bus interface configuration data may be stored in a random access memory element incorporated within bridge circuit 308. In yet another embodiment, PCI bus interface configuration data may be stored in a non-volatile memory element incorporated within bridge circuit 308.

Figure 15:
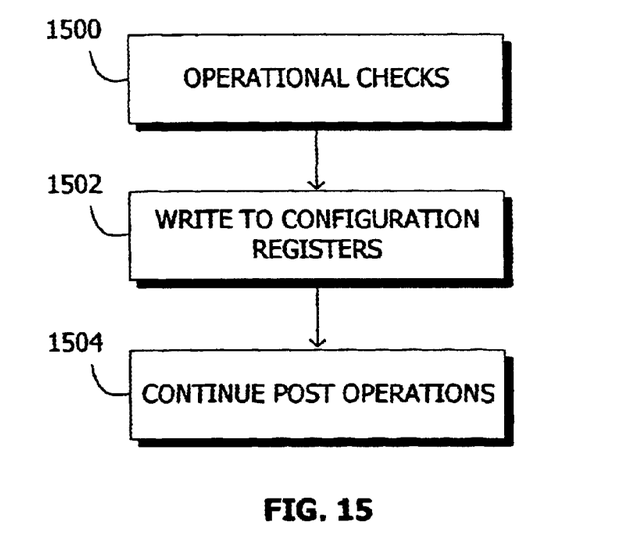
FIG. 15 shows a flowchart of a computer system startup process in accordance with one embodiment of the invention.

Referring now to FIG. 15, computer system POST operations may begin with a series of system checks to verify that various components of computer system 300 are functioning properly (block 1500). Next, BIOS routines 328 may write to configuration register(s) 432 to indicate which of the request/grant signal pairs are associated with the different types of device connectors (upper 32-bit connectors 302, lower 32-bit connectors 304 and 64-bit connectors 306). In one embodiment, each pair of request/grant signal pairs has a corresponding configuration register 432 entry; a bit, for example (block 1502). If the entry is a first value (e.g., a '1'), arbiter 408 determines the corresponding request/grant signal pair is associated with an upper 32-bit connector. If the entry is a second value (e.g., a '0'), arbiter 408 determines the corresponding request/grant signal pair is associated with a lower 32-bit connector or a 64-bit connector. Following the establishment of configuration register 432's contents, the remaining acts associated with POST processing may be performed (block 1504).

A PCI bus control circuit in accordance with the invention supports more PCI bus loads than prior art controllers. In one illustrative configuration, a PCI control circuit in accordance with FIGS. 3 and 4 supports 20 loads: 1 upper PCI bus load and 1 lower PCI bus load attributable to bridge circuit 308; 1 lower PCI bus load attributable to bridge circuit 322; 6 lower PCI bus loads attributable to 3 lower 32-bit connectors (e.g., 302); 6 upper PCI bus loads attributable to 3 upper 32-bit connectors (e.g., 304); 2 lower PCI bus loads and 2 upper PCI bus loads attributable to a 64-bit device connector (e.g., 306); and 1 upper PCI bus load attributable to a 32-bit device coupled to the computer system's motherboard. Thus, in this example a PCI bus controller in accordance with the invention supports 6 off-motherboard 32-bit devices, 1 on-motherboard 32-bit device, and 1 off-motherboard 64-bit device—a total of 7 off-motherboard devices and 1 on-motherboard device (in addition to the standard bridge circuits). In contrast, the prior art system of FIGS. 1 and 2 supports only 4 connectors (any combination of 32-bit and 64-bit).

While the invention has been disclosed with respect to a limited number of embodiments, numerous modifications and variations will be appreciated by those skilled in the art. For instance, a bus controller in accordance with the invention may partition a computer system's 32-bit PCI bus into more than 2 sub-busses. It will also be recognized that controller arbitration and/or signal control functions (performed by arbiter 408 and control unit 424 respectively), may be embodied in electronic control circuitry outside bridge circuit 308. It will further be recognized that the inventive technique may be applied to bus architectures other than the PCI bus architecture. It is intended, therefore, that the following claims cover all such modifications and variations that may fall within the true spirit and scope of the invention.

What is claimed is:

1. A bus control apparatus for use in a system having a first connector, a second connector, and a third connector, and a first set of data signal pathways for coupling to the first connector and second connector, and a second set of data signal pathways for coupling to the second connector and the third connector, the bus control apparatus comprising:
   an interface to couple to data signals, the data signals comprising a lower data portion and an upper data portion; and
   a signal control device to route the lower data portion over both the first set of data signal pathways and the second set of data signal pathways in a first mode, and to route the lower data portion over the first set of data signal pathways and the upper data portion over the second set of data signal pathways in a second mode.

2. The bus control apparatus of claim 1, wherein the interface comprises a 64-bit peripheral component interconnect interface.

3. The bus control apparatus of claim 2, wherein the second set of data signal pathways comprise AD[63::32], C/BE[7::4], and PAR64 signals, and the first set of data signal pathways comprise AD[31::0], C/BE[3::0], and PAR signals.

4. The bus control apparatus of claim 1, further comprising an arbiter to selectively place said signal control device in the first and second modes.

5. The bus control apparatus of claim 4, further comprising a configuration storage coupled to the arbiter to indicate a first set of signals are associated with a first set of 32-bit peripheral component interface devices, and a second set of signals are associated with a second set of 32-bit peripheral component interface devices.

6. The bus control apparatus of claim 5, wherein the first set of signals and the second set of signals comprise request/grant signal pairs.

7. The bus control apparatus of claim 6, wherein the first set of request/grant signal pairs are adapted to couple to 32-bit and 64-bit peripheral component interconnect devices, and the second set of request/grant signal pairs are adapted to couple to only 32-bit peripheral component interconnect devices.

8. The bus control apparatus of claim 1, wherein the first mode comprises a 32-bit transaction, and the second mode comprises a 64-bit transaction.

9. The bus control apparatus of claim 1, the interface to couple to control signals, and the signal control device to couple the control signals to a first set of control signal pathways in response to the first connector being part of a transaction, and the signal control device to couple the control signals to a second set of control signal pathways in response to the second or third connector being part of the transaction.

10. The bus control apparatus of claim 9, wherein the first and second sets of control signal pathways comprise duplicate sets of peripheral component interconnect control signals.

11. The bus control apparatus of claim 10, wherein each of the first and second sets of control signal pathways comprise FRAME#, TRDY#, IRDY#, STOP#, DEVSEL#, and LOCK# signals.

12. A system comprising:
   the bus control apparatus of claim 9,
   wherein the first connector has a first width, the second connector has a second width, and the third connector has the first width.

13. The system of claim 12, wherein the first connector is part of a first set of connectors, and the second connector is part of a second set of connectors.

14. A computer system comprising:
   a first set of connectors;
   a second set of connectors;
   a third set of connectors;
   a bus having lower data signal pathways, upper data signal pathways, lower control signal pathways and upper control signal pathways, the upper control signal pathways being a duplicate of the lower control signal pathways, the lower data signal pathways coupled to the first and second set of connectors, the lower control signal pathways coupled to the first and second set of connectors, the upper data signal pathways coupled to the third set of connectors and the upper control signal pathways coupled to the third set of connectors; and
   a bus control device coupled to the bus.

15. The computer system of claim 14, wherein the first and third sets of connectors comprise 32-bit peripheral component interconnect connectors and the second set of connectors comprise 64-bit peripheral component interconnect connectors.

16. The computer system of claim 14, further comprising a peripheral component interconnect bridge circuit coupled to the bus control device.

17. The computer system of claim 16, wherein the bus control device is incorporated within the peripheral component interconnect bridge circuit.

18. The computer system of claim 14, wherein the bus control unit device further comprises:
   a signal control unit coupled to the bus; and
   an interface unit, coupled to the signal control unit, to provide 64-bit peripheral component interconnect interface signals; and
   an arbiter unit adapted to determine which of said 64-bit peripheral component interconnect interface signals are coupled from the interface unit to the bus.

19. An apparatus for use in a system having a first connector of a first width, a second connector of the first width, and a third connector having a second, larger width, comprising:

control signal paths having an upper control portion for connection with the first connector, and a lower control portion for connection with the second connector;

data signal paths having an upper data portion for connection with the first connector and a lower data portion for connection with the second connector, both of the upper and lower data portions for connection with the third connector; and a signal control device to selectively route data onto the upper and lower data portions based on which of the first, second, and third connectors is involved in a transaction.

20. The apparatus of claim 19, wherein the upper and lower control portions contain duplicate sets of control signals.

21. The apparatus of claim 20, wherein the control signals comprise peripheral component interconnect FRAME#, TRDY#, IRDY#, STOP#, DEVSEL#, and LOCK# signals.

22. The apparatus of claim 20, wherein one of the upper and lower control portions is for connection to the third connector, wherein the signal control device is adapted to further:
route data of the first width onto the upper data portion in response to the first connector being involved in the transaction,
route data of the first width onto the lower data portion in response to the second connector being involved in the transaction, and
route data of the second width onto both the upper and data portions in response to the third connector being involved in the transaction.

23. A system comprising:

a first connector of a first width;

a second connector of a second width larger than the first width;

a third connector of the first width;

first data signal pathways;

second data signal pathways;

first control signal pathways;

second control signal pathways that are a duplicate of the first control signal pathways, the first data signal pathways coupled to the first and second connectors, the first control signal pathways coupled to the first and second connectors, the second data signal pathways coupled to the second and third connectors, and the second control signal pathways coupled to the third connector; and a bus control device coupled to the first and second data signal pathways and first and second control signal pathways.

24. A method for use in a system having a first connector of a first width, a second connector of a second, larger width, and a third connector of the first width, the method comprising:

selectively routing data over first and second data signal pathways, the first data signal pathways coupled to the first and second connectors, and the second data signal pathways coupled to the second and third connectors;

selectively routing control signals over first and second control signal pathways, the first control signal pathways coupled to the first and second connectors, and the second control signal pathways coupled to the third connector, wherein selectively routing the data and control signals is based on which of the first, second, and third connectors is involved in a transaction.

25. The method of claim 24, wherein the first and second control signal pathways are duplicates of each other.

26. The method of claim 24, wherein selectively routing the data comprises routing data of the first width over the first data signal pathways if the first connector is involved in the transaction.

27. The method of claim 26, wherein selectively routing the data comprises routing data of the first width over the second data signal pathways if the third connector is involved in the transaction.

28. The method of claim 27, wherein selectively routing the data comprises routing data of the second width over both the first and second data signal pathways if the second connector is involved in the transaction.

* * * * *

UNITED STATES PATENT AND TRADEMARK OFFICE
CERTIFICATE OF CORRECTION

PATENT NO. : 6,636,920 B1  Page 1 of 1
DATED : October 21, 2003
INVENTOR(S) : Douglas A. Larson It is certified that error appears in the above-identified patent and that said Letters Patent is hereby corrected as shown below:

Column 6,
Line 56, "unit" should be deleted.

Signed and Sealed this

Second Day of December, 2003

JAMES E. ROGAN
*Director of the United States Patent and Trademark Office*